United States Patent
Chaudhuri et al.

(10) Patent No.: US 8,805,111 B2
(45) Date of Patent: Aug. 12, 2014

(54) SYSTEM AND METHOD FOR FUSING IMAGES

(75) Inventors: Subhasis Chaudhuri, Mumbai (IN);
Ketan Kotwal, Mumbai (IN);
Shanmuganathan Raman, Tamil Nadu (IN)

(73) Assignee: Indian Institute of Technology Bombay, Powai, Mumbai (IN)

( * ) Notice: Subject to any disclaimer, the term of this patent is extended or adjusted under 35 U.S.C. 154(b) by 593 days.

(21) Appl. No.: 12/702,868

(22) Filed: Feb. 9, 2010

(65) Prior Publication Data

US 2011/0194788 A1 Aug. 11, 2011

(51) Int. Cl.
*G06K 9/40* (2006.01)
*G06T 5/50* (2006.01)
*G06T 11/00* (2006.01)

(52) U.S. Cl.
CPC . *G06T 5/50* (2013.01); *G06T 11/00* (2013.01); *G06T 2207/20192* (2013.01); *G06T 2207/20028* (2013.01); *G06T 2207/30181* (2013.01); *G06T 2207/20221* (2013.01); *G06T 2207/10036* (2013.01)
USPC ........... 382/260; 382/261; 382/262; 382/263; 382/264; 382/265; 382/266; 382/294

(58) Field of Classification Search
USPC ......................................... 382/294, 260–266
See application file for complete search history.

(56) References Cited

U.S. PATENT DOCUMENTS

| | | | |
|---|---|---|---|
| 6,526,183 B1 * | 2/2003 | Bonnet et al. | 382/284 |
| 6,694,064 B1 * | 2/2004 | Benkelman | 382/284 |
| 7,146,059 B1 * | 12/2006 | Durand et al. | 382/260 |
| 7,149,366 B1 * | 12/2006 | Sun | 382/284 |
| 7,428,333 B2 * | 9/2008 | Asari et al. | 382/167 |
| 2003/0081836 A1 * | 5/2003 | Averbuch et al. | 382/199 |
| 2003/0130767 A1 * | 7/2003 | Carroll | 701/3 |
| 2003/0190090 A1 * | 10/2003 | Beeman et al. | 382/284 |
| 2004/0184667 A1 * | 9/2004 | Raskar et al. | 382/254 |
| 2008/0159646 A1 * | 7/2008 | Katagiri et al. | 382/266 |
| 2008/0175510 A1 * | 7/2008 | Matsushita | 382/260 |
| 2008/0267530 A1 * | 10/2008 | Lim | 382/284 |

OTHER PUBLICATIONS

Visualization—filtering, Kotwal et el. IEEE, 0196-2892, Feb. 4, 2010, pp. 1-9.*
Bilateral filtering—images, Manduchi et al.,IEEE,1998, International conference on computer vision,Bombay India, pp. 1-8.*
Digital photography—Pairs, Petschnigg et al., Aug. 2004, pp. 664-672.*
Bilateral filtering—applications., Paris et al., now, CPAV vol. 4 No. 1 , 2008, pp. 1-73.*
On the origin of the bilateral filter—it, Michael Elad., IEEE, 1057-7149,2002, pp. 1141-1151.*
Multispectral Bilateral Video fusion, Bennett et al.,IEEE, 1057-7149, 2007, pp. 1185-1194.*

(Continued)

*Primary Examiner* — Jayesh A Patel
(74) *Attorney, Agent, or Firm* — Brundidge & Stanger, P.C.

(57) ABSTRACT

A system and method for generating a fused image is provided. The system comprises processing circuitry configured to receive a plurality of images, filter each received image using an edge preserving filter, compute a weight for each received image based on the corresponding filtered image and the received image and generate a fused image based on the weights of each received image. The system further comprises a memory device configured to store the fused image.

18 Claims, 3 Drawing Sheets

(56) References Cited

OTHER PUBLICATIONS

A Fundamental Relatioship between—Equation., Barash et al., IEEE, 2002, 0162-8828, pp. 844-847.*
(Visualization of hyperspectral image, pp. 1-17 Jun. 2009, applicant submitted IDS filed on Mar. 7, 2013).*
Visualization—filtering, Kotwal et el. IEEE, 0196-2892, Fibruary 4 2010, pp. 1-9.*
Visualization of hyperspectral image, pp. 1-17 Jun. 2009, applicant submitted I DS filed on Mar. 7, 2013.*
Bilateral filtering—Images, Manduchi et al.,IEEE, 1998, pp. 1-8.*
A fundamental Relationship between bilateral filtering, Adaptive smoothing—Equation., IEEE, Barash Danny, pp. 844-847.*
Bilateral filter—Photography, Raman et al. Eurographics 2009, pp. 1-4.*
Bilateral filtering—Images, Manduchi et al., IEEE, 1998, pp. 1-8.*
A fundamental Relationship between bilateral filtering, Adaptive smoothing—Equaton., IEEE, Barash Danny, pp. 844-847.*
Bennett, Eric P., et al., "Multispectral Bilateral Video Fusion," IEEE Transactions on Image Processing, vol. 16, No. 5, pp. 1185-1194, May 2007.
Debevec, Paul, et al., "Computational Photography: Advanced Topics," PowerPoint Presentation, Siggraph 2008.
Eisemann, Elmar, et al., "Flash Photography Enhancement via Intrinsic Relighting," ACM Transactions on Graphics (TOG), vol. 23 , Issue 3 (Aug. 2004).
Farsiu, Sina et al., "Fast and Robust Multi-Frame Super-Resolution," IEEE Transactions on Image Processing, vol. 13, No. 10, Oct. 2004.
Kotwal, Ketan, et al., "Visualization of Hyperspectral Images Using Bilateral Filtering," IEEE Transactions on Geoscience and Remote Sensing, IEEE Trans. Geoscience and Remote Sensing, (to appear), Feb. 4, 2010 from IEEE Xplore.
Petschnigg, Georg, et al., "Digital Photography with Flash and No-Flash Image Pairs," SIGGRAPH 2004, Aug. 2004. pp. 664-672.
Raman, Shanmuganathan et al., "Bilateral Filter Based Compositing for Variable Exposure Photography," In Short Papers, Eurographics, 1-4, 2009.
Raskar, Ramesh, et al., "Non-photorealistic Camera: Depth Edge Detection and Stylized Rendering using Multi-Flash Imaging," ACM SIGGRAPH 2004, Aug. 2004.
Dr. Yossi Rubner., "Fusion and Reconstruction," PowerPoint Presentation.
Stein, D. et al., "Hyperspectral Imaging for Intelligence, Surveillance, and Reconnaissance," Space and Naval Warfare Systems Center, pp. 108-116, San Diego, CA, Aug. 2001.
Ren, H. and Chang, C. "Automatic spectral target recognition in hyperspectral imagery," IEEE Transactions on Aerospace and Electronic Systems, vol. 39, Issue 4, pp. 1232-1249, Oct. 2003.
Ardouin, J. P. et al., "A demonstration of hyperspectral image exploitation for military applications," 10th International Conference on Information Fusion, pp. 1-8, Jul. 9-12, 2007.
Wang, Z. et al., "A Comparative Analysis of Image Fusion Methods," IEEE Transactions on Geoscience and Remote Sensing, vol. 43, Issue 6, pp. 1391-1402, Jun. 2005.
Alparone, L. et al., "Comparison of Pansharpening Algorithms: Outcome of the 2006 GRS-S Data-Fusion Contect," IEEE Transactions on Geoscience and Remote Sensing, vol. 45, No. 10, pp. 3012-3021, Oct. 2007.
Alparone, L. et al., "Fusion of Multispectral and SAR Images by Intensity Modulation," Proceedings of the 7th International Conference on Information Fusion, pp. 637-643, 2004.
Gonzalez, A.M. et al., "A low computational-cost method to fuse IKONOS images using the spectral response function of its sensors," IEEE Transactions on Geoscience and Remote Sensing, vol. 44, Issue 6, pp. 1683-1691, Jun. 2006.
Dou, W. et al., "A general framework for component substitution image fusion: An implementation using the fast image fusion method," Computers & Geosciences, vol. 33, Issue 2, pp. 219-228, Feb. 2007.
Joshi, M. et al., "A Model-Based Approach to Multiresolution Fusion in Remotely Sensed Images," IEEE Transactions on Geoscience and Remote Sensing, vol. 44, Issue 6, pp. 2549-2562, Sep. 2006.
Zhang, W. and Kang, J., "Quick-Bird Panchromatic and Multi-Spectral Image Fusion Using Wavelet Packet Transform," Lecture notes in Control and Information Sciences, vol. 344, pp. 976-981, 2006.
Shah, V.P. et al., "An Efficient Pan-Sharpening Method via a Combined Adaptive PCA Approach and Contourlets," IEEE Transactions on Geoscience and Remote Sensing, vol. 46, Issue 5, pp. 1323-1335, May 2008.
Guo, B. et al., "Hyperspectral image fusion using spectrally weighted kernels," 8th International Conference on Information Fusion, vol. 1, Jul. 25-28, 2005.
Wilson, T. et al., "Perceptual-based image fusion for hyperspectral data," IEEE Transactions on Geoscience and Remote Sensing, vol. 35, No. 4, pp. 1007-1017, Jul. 1997.
Lewis, J.J. et al., "Pixel-and region-based image fusion with complex wavelets," Information Fusion, vol. 8, Issue 2, pp. 119-130, Apr. 2007.
Ready, P. and Wintz, P. "Information Extraction, SNR Improvement, and Data Compression in Multispectral Imagery," IEEE Transactions on Communications, vol. 21, Issue 10, pp. 1123-1131, Oct. 1973.
Tyo, J.S. et al., "Principal-components-based display strategy for spectral imagery ," IEEE Transactions on Geoscience and Remote Sensing, vol. 41, Issue 3, pp. 708-718, Mar. 2003.
Tsagaris, V. et al., "Fusion of hyperspectral data using segmented PCT for color representation and classification," IEEE Transactions on Geoscience and Remote Sensing, vol. 43, Issue 10, pp. 2365-2375, Oct. 2005.
Jacobson, N. et al., "Linear Fusion of Image Sets for Display," IEEE Transactions on Geoscience and Remote Sensing, vol. 45, Issue 10, pp. 3277-3288, Oct. 2007.
Cai, S. et al., "Hyperspectral Imagery Visualization Using Double Layers," IEEE Transactions on Geoscience and Remote Sensing, vol. 45, Issue 10, pp. 3028-3036, Oct. 2007.
Demir, B et al., "A Low-Complexity Approach for the Color Display of Hyperspectral Remote-Sensing Images Using One-Bit-Transform-Based Band Selection," IEEE Transactions on Geoscience and Remote Sensing, vol. 47, Issue 1, pp. 97-105, Jan. 2009.
Jacobson, N. and Gupta, M. "Design goals and solutions for display of hyperspectral images," IEEE Transactions on Geoscience and Remote Sensing, vol. 43, No. 11, pp. 2684-2692, Nov. 2005.
Zhu, Y. et al., "Evaluation of ICA based fusion of hyperspectral images for color display," 10th International Conference on Information Fusion, pp. 1-7, Jul. 2007.
Tomasi, C. and Manduchi, R., "Bilateral Filtering for Gray and Color Images," ICCV '98, Proceedings of the Sixth International Conference on Computer Vision, p. 8, IEEE Computer Society, 1998.
Sylvain, P. and Fredo, D., "A Fast Approximation of the Bilateral Filter using a Signal Processing Approach," ECCV '06, Proceedings of the European Conference on Computer Vision, pp. 12, May 2006.
Weiss, B., "Fast median and bilateral filtering," ACM Trans. Graph., vol. 25, No. 3, pp. 519-526, 2006.
Paris, S. et al., "A gentle introduction to bilateral filtering and its applications," SIGGRAPH '08, ACM SIGGRAPH 2008 classes, pp. 1-50, ACM, 2008.
Bae, S. et al., "Two-scale tone management for photographic look," ACM Transanctions on Graphics, vol. 25, Issue 3, pp. 637-645, 2006.
Bennett, E.P. and McMillan, L. "Fine feature preservation in HDR tone mapping," SIGGRAPH '06: ACM SIGGRAPH 2006 Sketches, Article No. 125, ACM, 2006.
Bennett, E. et al., "Multispectral Bilateral Video Fusion," IEEE Transactions on Image Processing, vol. 16, Issue 05, pp. 1185-1194, May 2007.
Raman, S. and Chaudhuri, S., "Bilateral Filter Based Compositing for Variable Exposure Photography," Eurographics'09, Proceedings of the Eurographics Conference, pp. 4, Mar. 2009.
Xydeas, C. and Petrovic, V., "Objective image fusion performance measure," Electronics Letters, vol. 36, pp. 308-309, Feb. 2000.
Wald, L., "Quality of High Resolution Synthesized Images: Is there a simple criterion?," Proc. Internat. Conf. on Fusion of Earth Data, vol. 1, pp. 99-105, Jan. 2000.

(56) References Cited

OTHER PUBLICATIONS

Wang, Z. and Bovik, A.G., "A Universal Image Quality Index," IEEE Signal Processing Letters, vol. 9, pp. 81-84, Mar. 2002.

Cao, W. et al., "A remote sensing image fusion method based on PCA transform and wavelet packet transform," Proceedings of the 2003 International Conference on Neural Networks and Signal Processing, vol. 2, pp. 976-981, Dec. 14-17, 2003.

Aydin, T.O. et al., "Dynamic range independent image quality assessment," SIGGRAPH, pp. 10, 2008.

Blinn, J. F., "Compositing, part 1: Theory," IEEE Computer Graphics & Applications, vol. 14, No. 5, pp. 83-87, 1994.

Durand, F. and Dorsey, J., "Fast bilateral filtering for the display of high-dynamic-range images," Transactions on Graphics, SIGGRAPH 2002.

Debevec, P. and Malik, J., "Recovering high dynamic range radiance maps from photographs," Proceedings of the 24th annual conference on Computer Graphics and interactive techniques, SIGGRAPH, pp. 369-378, 1997.

Eisemann, E. and Durand, F., "Flash photography enhancement via intrinsic relighting," ACM Transaction on Graphics, Siggraph, vol. 23, Issue 3, pp. 673-678, 2004.

Fattal, R. et al., "Multiscale shape and detail enhancement from multi-light image collections," ACM Transaction on Graphics, Siggraph, vol. 26, No. 3, Article No. 51, pp. 9, 2007.

Goshtasby, A., "Fusion of multi-exposure images," Image and Vision Computing, vol. 23, Issue 06, pp. 611-618, 2005.

Mertens, T. et al., "Exposure fusion," in Pacific Graphics, pp. 9, 2007.

Mitsunaga, T. and Nayar, S.K., "Radiometric self calibration," CVPR, pp. 374-380, 1999.

Mann, S. and Picard, R.W., "On being undigital with digital cameras: extending dynamic range by combining exposed pictures," In Proceedings of IS & T 48th annual conference, pp. 422-428, 1995.

Porter, T. and Duff, T., "Compositing digital images," Computer Graphics, vol. 18, No. 3, pp. 253-259, Jul. 1984.

Paris, S. and Durand, F., "A fast approximation of the bilateral filter using a signal processing approach," ECCV, pp. 12, 2006.

Raman, S. and Chaudhuri, S., "A matte-less, variational approach to automatic scene compositing," IEEE, 11th Conference on Computer Vision, pp. 1-6, Ocotber 14-21, 2007.

Tomasi, C. and Manduchi, R., "Bilateral filtering for gray and color images," Proceedings of the IEEE International Conference on Computer Vision, pp. 8, 1998.

"The AVIRIS data," accessed at http://aviris.jpl.nasa.gov, accessed on May 24, 2012.

Chaudhuri, S. and Kotwal, K. "Visualization of Hyperspectral Image," pp. 1-17, Jun. 2009.

Bae, S. et al., "Two-scale tone management for photographic look," ACM Transactions on Graphics, vol. 25, Issue 3, pp. 9, Jul. 2006.

\* cited by examiner

SYSTEM AND METHOD FOR FUSING IMAGES

BACKGROUND

In many image processing applications, such as geographic survey systems, several image sensors are employed. Images generated by these sensors usually contain data related to a single region of interest. In many instances, the images are received at different wavelengths by one or more sensors.

Such images present abundant multidimensional information which contains several image bands. However, not all such images can be displayed on a standard display. Therefore, these images are fused together to form a single image. The single fused image typically contains important features extracted from all the images that were received.

There are several image fusion techniques that are applied to combine multiple images with varying information into one fused image. One such technique is based on the averaging of images across the different wavelengths or spectral bands. The technique assigns equal weight to each spectral band and produces a result equivalent to integration of a spectral response at each pixel. However, as the information across bands is not uniformly distributed, large amounts of information may be lost during the fusing process.

Another image fusion technique assigns unequal weights to the spectral bands. The weight assigned for each image depends on the application and the purpose of visualization. Specifically, application dependent kernels are used to assign spectral weights to the spectral bands. Since the weights depend on application specific information in the spectral band, the likelihood that useful contents in the images are retained is increased. However, in the techniques described above, certain features such as weak edges, textures and the like can be difficult to retain in the fused image.

SUMMARY

Briefly, according to one embodiment of the present technique, a method for generating a fused image is provided. The method comprises receiving a plurality of images, filtering each received image using an edge preserving filter, computing a weight for each pixel in the received images based on the corresponding filtered image and the received image; and generating a fused image based on the weights of each received image.

In another embodiment, a method for generating a fused image is provided. The method comprises receiving a plurality of images, filtering each received image using a bilateral filter, computing a weight for each pixel in the received images by subtracting each pixel value in the filtered image from the corresponding pixel value in the received image. The method further comprises generating a fused image based on the weights of each received image.

In another embodiment, a system for generating a fused image is provided. The system comprising processing circuitry configured to receive a plurality of images, filter each received image using an edge preserving filter, compute a weight for each received image based on the corresponding filtered image and the received image and generate a fused image based on the weights of each received image. The system further comprises a memory device configured to store the fused image.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Example embodiments are generally directed to fusing of multiple images. An embodiment provides a method for generating a fused image from several images by computing a weight for each image as described. The following description is with reference to a remote sensing application, however it should be understood that the techniques described herein may be applied in various other applications such as medical image processing, security systems, environment monitoring, geological surveying, photography, and the like.

Figure 1:
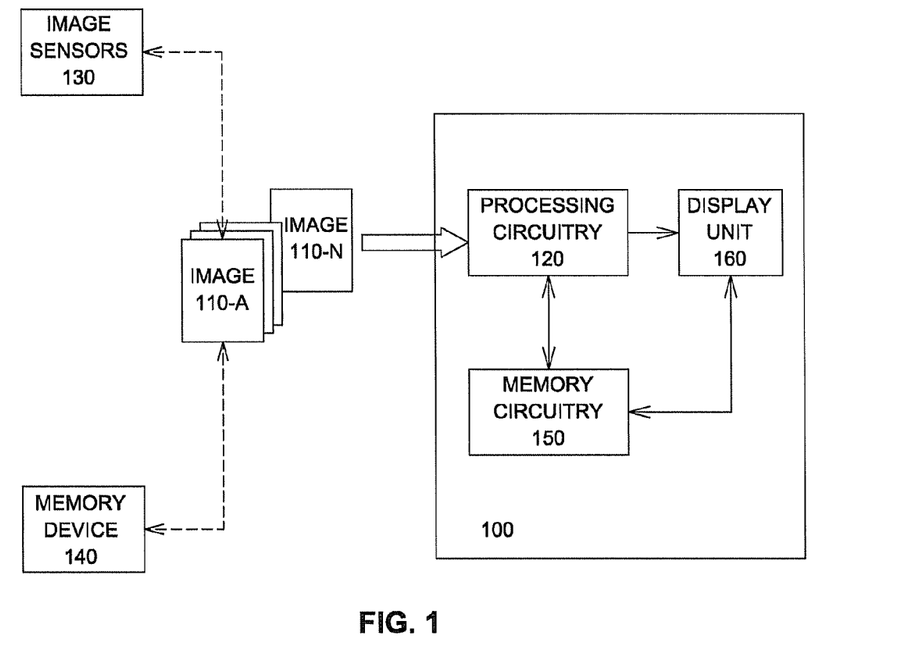
FIG. 1 is a block diagram of an example imaging system.

FIG. 1 is a block diagram of an example imaging system. Imaging system 100 comprises processing circuitry 120, memory 150 and display unit 160. The plurality of images 110-A through 110-N represents image data from a single geographic location or area. Each block is described in further detail below.

Processing circuitry 120 includes one or more processors (not shown) configured to access a plurality of images 110-A through 110-N. In one embodiment, the plurality of images comprises image data received at a corresponding plurality of wavelengths.

Processing circuitry may be configured to receive the images from image sensors 130 or from an external memory device 140. In one embodiment, the image sensors 130 comprise hyperspectral imaging sensors that provide high resolution spectral information covering the visible light as well as the infrared wavelength spectra.

Processing circuitry is further configured to apply a filter on each image 110-A through 110-N. In one embodiment, an edge preserving filter is applied. In another embodiment, a bilateral filter is used. The bilateral filter includes spatial domain filtering and range filtering that achieves image smoothing while preserving sharp edges. This filtering technique combines neighborhood pixels based on their spatial as well as photometric closeness, to assign pixel values which satisfy proximity in both the domains.

Processing circuitry is further configured to compute a weight for each image 110-A through 110-N. In one embodiment, the weight is based on the filtered image and the image originally received by processing circuitry. In a further embodiment, the weight is computed based on a difference between the pixels of the filtered image and the original image. The processing circuitry is further configured to generate a fused image based on the weights of each pixel in each image 110-A through 110-N.

Memory circuit 150 is configured to store the fused image. The memory circuit 150 may include hard disk drives, optical drives, tape drives, random access memory (RAM), read-only memory (ROM), programmable read-only memory (PROM), redundant arrays of independent disks (RAID), flash memory, magneto-optical memory, holographic memory, bubble memory, magnetic drum, memory stick, Mylar® tape, smartdisk, thin film memory, zip drive, and so forth.

Display unit 160 is configured to display the fused image. As described above, the processing circuitry is configured to compute a weight for each image 110-A through 110-N. The manner in which the weights for each pixel in the images are computed is described in further detail below.

Figure 2:
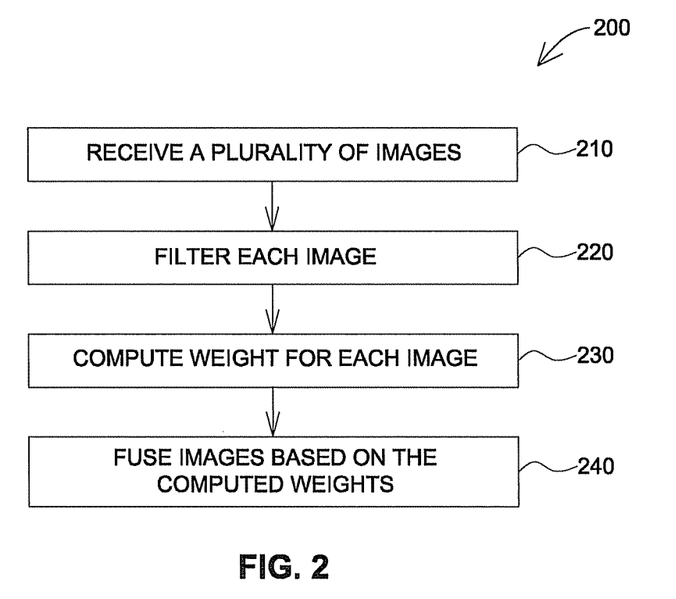
FIG. 2 is a flow chart illustrating one method by which a weight for an image is computed.

FIG. 2 is a flow chart illustrating one technique by which the weights are computed. The process 200 begins at step 210 where a plurality of images is received. In one embodiment, each image represents image data from a specific wavelength.

At step 220, each image is filtered using an edge preserving filter. In one embodiment, a smoothing filter. The smoothing filter can be used to remove minor variations in the image while preserving strong edges. In one embodiment, a non-linear filtering technique such as a bilateral filter is used.

At step 230, weight for each pixel in the image is computed based on the corresponding filtered image and the received image. In one embodiment, the weight for each image is computed on a pixel-by-pixel basis by comparison of pixel values of each received image with their respective filtered values. In addition, a sum of all weights for all images is equal to unity.

At step 240, a fused image is generated based on the weights of the pixels in each image. Since the weight of each pixel in the image is computed from the relative importance of a feature with respect to its neighborhood there is no loss of information from individual spectral bands. An example technique to compute the weights of the images is described below.

Figure 3:
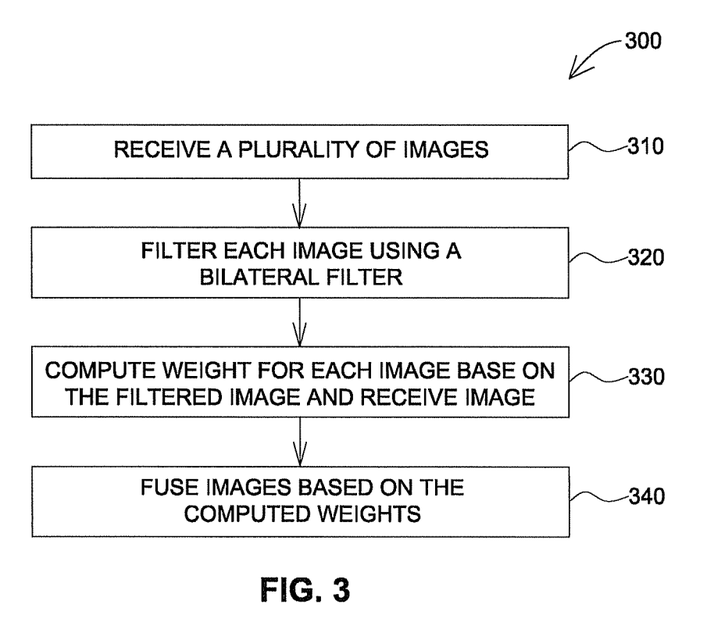
FIG. 3 is a flow chart illustrating a specific method by which a weight for an image is computed.

FIG. 3 is a flow chart illustrating a specific technique to compute a weight of an image. At step 310, a plurality of images is received. In one embodiment, each image is received at different wavelength band. In another embodiment, a first set of images are received in a first wavelength band and a second set of images are received in a second wavelength band, and so forth.

At step 320, each image is filtered using a bilateral filter. The bilateral filter can be represented as follows:

$$h(x) = \frac{1}{k(x)} \int_{-\infty}^{\infty} f(\zeta) c(\zeta, x) S(f(\zeta), f(x)) d\zeta \qquad \text{Equation (1)}$$

where $f(x)$ is the received image and $h(x)$ is the corresponding bilaterally filtered image. The function $c(\zeta, x)$ measures spatial closeness of neighbourhood centre $x$ and a surrounding point $\zeta$. The photometric similarity or range closeness between a neighborhood pixel 'x' and surrounding point $\zeta$ is measured by $S(f(\zeta), f(x))$. The normalization factor 'k' is given by the following equation $$k(x) = \int_{-\infty}^{\infty} c(\zeta, x) S(f(\zeta), f(x)) d\zeta \qquad \text{Equation (2)}$$

At step 330, computing a weight is computed from the filtered image and the received image. In one embodiment, the weight is computed based on a difference between each pixel value in the received image and the corresponding pixel value in the filtered image.

In one embodiment, for a set of 'M' images in λ wavelength bands, the weight of the image is computed based on the following relationship:

$$w_i(x, y) = \frac{|I(x, y, \lambda_i) - I_{BF}(x, y, \lambda_i)| + K}{\sum_{i=1}^{M} (|I(x, y, \lambda_i) - I_{BF}(x, y, \lambda_i)| + K)} \qquad \text{Equation (3)}$$

where 'I' is an image in the plurality of images and '$I_{BF}$' is the corresponding bilateral filtered image 'K' is a positive real number.

The constant 'K' in equation (3) provides numerical stability while computing weights of homogenous regions In an embodiment, a sum of all weights for all images is equal to unity.

At step 340, a fused image is generated based on the weights of each image. In one embodiment, the fused image $I_F(x,y)$ is generated using the relationship:

$$I_F(x, y) = \sum_{i=1}^{M} w_i(x, y) I(x, y, \lambda_i) \qquad \text{Equation (4)}$$

Figure 4:
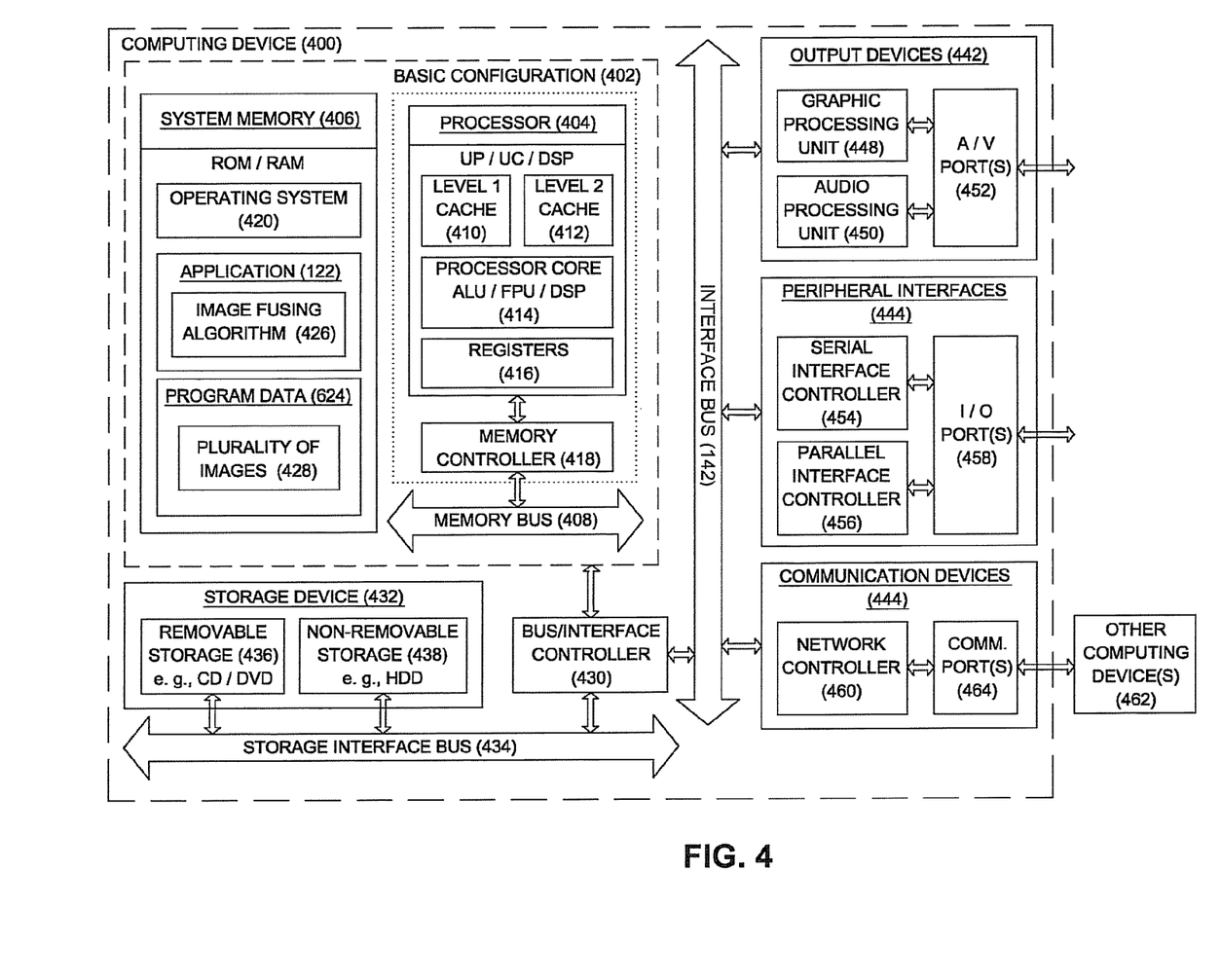
FIG. 4 is a block diagram of an embodiment of a computing device.

FIG. 4 is a block diagram illustrating an example computing device 400 that is arranged for generating a fused image from a plurality of images in accordance with the present disclosure. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a image fusing 426 that is arranged to fuse an image from a plurality of images. Program data 424 may include data the images that are required to be fused into a single image which may be useful for various applications such as image processing as is described herein. In some embodiments, application 422 may be arranged to operate with program data 424 on operating system 420 such that a fused image is generated from a set of images. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for generating a fused image, the method comprising:
    receiving a plurality of images;
    bi-laterally filtering, including spatial domain filtering and range filtering, each of the plurality of received images;
    computing a weight of each pixel in the plurality of received images based on a corresponding bi-laterally filtered image and the plurality of received images by subtracting each pixel in the corresponding bi-lateral filtered image from corresponding pixel in the plurality of received images; and
    generating a fused image based on the weight of each pixel in each of the plurality of received images.

2. The method of claim 1, wherein the weight of each of the plurality of received images is computed on a pixel-by-pixel basis by comparison of pixel values of each of the plurality of received images with a respective filtered value.

3. The method of claim 1, wherein a sum of weights for the plurality of images is equal to unity.

4. The method of claim 1, wherein the plurality of images is received at a corresponding plurality of wavelengths.

5. The method of claim 1, wherein the weight of each pixel in an image $I(x, y, \lambda_i)$ in a set of 'M' images is computed based upon th relationship:

$$w_i(x, y) = \frac{|I(x, y, \lambda_i) - I_{BF}(x, y, \lambda_i)| + K}{\sum_{l=1}^{M} (|I(x, y, \lambda_i) - I_{BF}(x, y, \lambda_i)| + K)}$$

wherein the image $I_{BF}(x, y, \lambda_i)$ is the bi-laterally filtered image, K is a positive real number, and $\lambda_i$ represents an index number of each of the plurality of received images.

6. The method of claim 1, wherein the plurality of received images represent information of a geographical region.

7. A memory device comprising computer executable instructions that, in response to being executed, perform operations comprising:
    receiving a plurality of images;
    bi-laterally filtering, including spatial domain filtering and range filtering, each of the plurality of received images;
    computing a weight of each pixel in the plurality of received images based on a corresponding bi-laterally filtered image and the plurality of received images by subtracting each pixel value in the corresponding bi-laterally filtered image from a corresponding pixel value in the plurality of received images; and
    generating a fused image based on the weight of each pixel in the plurality of received images.

8. The memory device of claim 7, wherein a sum of weights of a pixel of the plurality of images is equal to unity.

9. The memory device of claim 7, wherein the plurality of images includes hyperspectral images.

10. The memory device of claim 7, wherein the weight of an image $I(x, y, \lambda_i)$ in a set of 'M' images is computed based upton the relationship:

$$w_i(x, y) = \frac{|I(x, y, \lambda_i) - I_{BF}(x, y, \lambda_i)| + K}{\sum_{l=1}^{M} (|I(x, y, \lambda_i) - I_{BF}(x, y, \lambda_i)| + K)}$$

wherein the image $I_{BF}(x, y, \lambda_i)$ is the filtered image, K is a positive real number, and $\lambda_i$ represents each received image.

11. A system for generating a fused image, the system comprising:
    processing circuitry configured to:
        receive a plurality of images;
        bi-laterally filter, including spatial domain filtering and range filtering, each received image;
        compute a weight for each pixel in the plurality of received images based on a corresponding bi-laterally filtered image and the plurality of received images by subtracting each pixel in the corresponding bi-lateral filtered image from a corresponding pixel in the plurality of received images
        generate a fused image based on the weights of each pixel in each of the plurality of received images; and
    a memory device configured to store the fused image.

12. The system of claim 11, wherein a sum of weights for the plurality of received images is equal to unity.

13. The system of claim 11, wherein the plurality of images represent information of a geographical area.

14. The system of claim 11, further comprising hyperspectral sensors configured to generate the plurality of images.

15. The system of claim 11, whererin the processor is configured to compute the weight of an image I(x, y, $\lambda_i$) in a set of 'M' images is computed based upon the relationship:

$$w_i(x, y) = \frac{|I(x, y, \lambda_i) - I_{BF}(x, y, \lambda_i)| + K}{\sum_{l=1}^{M} (|I(x, y, \lambda_i) - I_{BF}(x, y, \lambda_i)| + K)}$$

wherein the image $I_{BF}$(x, y, $\lambda_i$) is a filtered image, K is a positive real number, and $\lambda_i$ represents each received image.

16. The method of claim 1, wherein the bi-lateral filtering includes measuring spatial closeness of a neighborhood pixel and a surrounding point.

17. The memory device of claim 7, wherein the bi-lateral filtering includes measuring spatial closeness of a neighborhood pixel and a surrounding point.

18. The system of claim 11, wherein the processing circuitry is configured to bi-laterally filter each of the plurality of received images by measuring spatial closeness of a neighborhood pixel and a surrounding point.

* * * * *

UNITED STATES PATENT AND TRADEMARK OFFICE
CERTIFICATE OF CORRECTION

PATENT NO. : 8,805,111 B2
APPLICATION NO. : 12/702868
DATED : August 12, 2014
INVENTOR(S) : Chaudhuri et al.

Page 1 of 4

It is certified that error appears in the above-identified patent and that said Letters Patent is hereby corrected as shown below:

On the title page, item (56), References Cited, under "OTHER PUBLICATIONS", in Column 2, Line 1, delete "et el." and insert -- et al. --, therefor.

On title page 2, item (56), References Cited, under "OTHER PUBLICATIONS", in Column 1, Line 1, delete "Relatioship" and insert -- Relationship --, therefor.

On title page 2, item (56), References Cited, under "OTHER PUBLICATIONS", in Column 1, Lines 5-6, delete "Visualization--filtering, Kotwal et el. IEEE, 0196-2892, Fibruary 4 2010, pp. 1-9.".

On title page 2, item (56), References Cited, under "OTHER PUBLICATIONS", in Column 1, Line 8, delete "I DS" and insert -- IDS --, therefor.

On title page 2, item (56), References Cited, under "OTHER PUBLICATIONS", in Column 1, Line 16, delete "Equaton.," and insert -- Equation, --, therefor.

On title page 2, item (56), References Cited, under "OTHER PUBLICATIONS", in Column 1, Line 54, delete "Contect,"" and insert -- Contest," --, therefor.

On title page 3, item (56), References Cited, under "OTHER PUBLICATIONS", in Column 1, Line 1, delete "Bovik, A.G.," and insert -- Bovik, A.C., --, therefor.

In the Drawings

In Fig. 4, Sheet 3 of 3, delete "UP/UC / DSP" and insert -- μP/μC / DSP --, therefor.

In Fig. 4, Sheet 3 of 3, delete "  " and

Signed and Sealed this
Twenty-fourth Day of February, 2015

Michelle K. Lee
*Deputy Director of the United States Patent and Trademark Office* insert -- COMMUNICATION DEVICES (446) --, therefor. (See Attached Drawing Sheet)

In the Claims

Column 7, Line 56, in Claim 1, delete "from corresponding" and insert -- from a corresponding --, therefor.

Column 7, Line 66, in Claim 4, delete "images" and insert -- received images --, therefor.

Column 8, Line 3, in Claim 5, delete "th" and insert -- the --, therefor.

Column 8, Lines 6-9, in Claim 5, delete " $w_i(x, y) = \frac{|I(x, y, \lambda_i) - I_{BF}(x, y, \lambda_i)| + K}{\sum_{i=1}^{M} (|I(x, y, \lambda_i) - I_{BF}(x, y, \lambda_i)| + K)}$ " and insert -- $w_i(x, y) = \frac{|I(x, y, \lambda_i) - I_{BF}(x, y, \lambda_i)| + K}{\sum_{i=1}^{M} (|I(x, y, \lambda_i) - I_{BF}(x, y, \lambda_i)| + K)}$ --, therefor.

Column 8, Lines 40-42, in Claim 10, delete " $w_i(x, y) = \frac{|I(x, y, \lambda_i) - I_{BF}(x, y, \lambda_i)| + K}{\sum_{i=1}^{M} (|I(x, y, \lambda_i) - I_{BF}(x, y, \lambda_i)| + K)}$ " and insert -- $$w_i(x, y) = \frac{|I(x, y, \lambda_i) - I_{BF}(x, y, \lambda_i)| + K}{\sum_{i=1}^{M} (|I(x, y, \lambda_i) - I_{BF}(x, y, \lambda_i)| + K)}$$ --, therefor.

Column 8, Line 52, in Claim 11, delete "each received image;" and insert -- each of the plurality of received images; --, therefor.

Column 8, Line 53, in Claim 11, delete "weight for" and insert -- weight of --, therefor.

Column 8, Line 58, in Claim 11, delete "images" and insert -- images; --, therefor.

Column 9, Line 1, in Claim 15, delete "whererin the" and insert -- wherein the --, therefor.

Column 9, Lines 6-8, in Claim 15, delete " $w_i(x, y) = \frac{|I(x, y, \lambda_i) - I_{BF}(x, y, \lambda_i)| + K}{\sum_{i=1}^{M} (|I(x, y, \lambda_i) - I_{BF}(x, y, \lambda_i)| + K)}$ " and insert -- $$w_i(x, y) = \frac{|I(x, y, \lambda_i) - I_{BF}(x, y, \lambda_i)| + K}{\sum_{i=1}^{M} (|I(x, y, \lambda_i) - I_{BF}(x, y, \lambda_i)| + K)}$$ --, therefor.

Column 9, Line 20, in Claim 18, delete "is configured" and insert -- is further configured --, therefor.

FIG. 4